US011754776B2

(12) United States Patent
Tsudaka et al.

(10) Patent No.: US 11,754,776 B2
(45) Date of Patent: Sep. 12, 2023

(54) LIGHT-EMITTING FIBER

(71) Applicant: KURARAY CO., LTD., Kurashiki (JP)

(72) Inventors: Takeshi Tsudaka, Kurashiki (JP);
Yosuke Washitake, Okayama (JP);
Ryokei Endo, Tokyo (JP); Shunsuke Suiko, Osaka (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 17/286,554

(22) PCT Filed: Oct. 23, 2019

(86) PCT No.: PCT/JP2019/041557
§ 371 (c)(1),
(2) Date: Apr. 19, 2021

(87) PCT Pub. No.: WO2020/090590
PCT Pub. Date: May 7, 2020

(65) Prior Publication Data
US 2021/0382228 A1    Dec. 9, 2021

(30) Foreign Application Priority Data

Nov. 1, 2018  (JP) ................. 2018-206844

(51) Int. Cl.
*G02B 6/02* (2006.01)
*G02B 1/04* (2006.01)
*F21V 8/00* (2006.01)

(52) U.S. Cl.
CPC ......... *G02B 6/02033* (2013.01); *G02B 1/046* (2013.01); *G02B 6/001* (2013.01)

(58) Field of Classification Search
CPC ..... G02B 6/02033; G02B 1/046; G02B 6/001
See application file for complete search history.

(56) References Cited

U.S. PATENT DOCUMENTS

| 5,596,671 A * | 1/1997 | Rockwell, III | G02B 6/04 385/147 |
| 6,154,595 A | 11/2000 | Yokogawa et al. | |
| 10,480,775 B2 * | 11/2019 | Yamada | G02B 6/001 |
| 2011/0063872 A1 | 3/2011 | Shinichi | |
| 2016/0299276 A1 * | 10/2016 | Yamamoto | G02B 6/001 |

FOREIGN PATENT DOCUMENTS

| JP | H11-109144 A | 4/1999 |
| JP | 20013500524 | 12/2001 |
| JP | 2017211472 A | 11/2017 |

OTHER PUBLICATIONS

Extended European Search Report dated Jul. 14, 2021 in Patent Application No. 19880882.6, 7 pages.
International Search Report dated Dec. 17, 2019 in PCT/JP2019/041557 (with English translation), 5 pages.
Office Action dated Mar. 3, 2022 in European Patent Application No. 19880882.6, 5 pages.
Office Action dated Aug. 3, 2022 in European Patent Application No. 19880882.6, 3 pages.

* cited by examiner

*Primary Examiner* — John Bedtelyon
(74) *Attorney, Agent, or Firm* — Element IP, PLC

(57) ABSTRACT

A light-emitting fiber includes a core and a cladding and is configured to emit light through a side surface of the fiber. A resin used for the core is at least one selected from the group consisting of polymethyl methacrylate, polymethyl methacrylate copolymers, polystyrene, polycarbonates, polyorganosiloxanes, and norbornene, and a resin used for the cladding is fluorine resin. The light-emitting fiber has a fiber diameter of 95 μm or less.

16 Claims, No Drawings

LIGHT-EMITTING FIBER

TECHNICAL FIELD

The present invention relates to light-emitting fibers.

BACKGROUND ART

Conventionally, optical fiber light guides that use optical fibers, each comprised of a core and a cladding, for lighting applications are known in the art. This type of light guide is formed by bundling one or more light-emitting plastic optical fibers and coating the optical fiber bundle with a coating layer. Light entering one end of the light guide propagates through the core and is leaked from the cladding of a part (side surface) in the longitudinal direction of the light guide. The light guide thus functions as a linear light emitter.

For example, a light-emitting plastic optical fiber light guide with efficient side emission of light-emitting plastic optical fibers and a longer side emission area in the longitudinal direction is disclosed (see, e.g., Patent Document 1). In this light-emitting plastic optical fiber light guide, each light-emitting plastic optical fiber composed of two layers of a core and a cladding has a specific relationship between its total circumferential length and cross-sectional area to achieve the efficient side emission.

CITATION LIST

Patent Document

PATENT DOCUMENT 1: Japanese Unexamined Patent Publication No. 2017-211472

SUMMARY OF THE INVENTION

Technical Problem

It is possible to process the light-emitting plastic optical fibers described in Patent Document 1 into a linear light emitter. However, since the optical fibers have poor flexibility and are hard and fragile, not only it is difficult to process the optical fibers into a fiber structure such as a woven or knitted fabric, but also the obtained fiber structure such as a woven or knitted fabric has poor bending properties.

The present invention was made in view of the above problems, and it is an object of the present invention to provide a light-emitting fiber that is highly flexible and is capable of being easily processed into a fiber structure such as a woven or knitted fabric while maintaining its light-emission properties.

Solution to the Problem

In order to achieve the above object, a light-emitting fiber according to the present invention is a light-emitting fiber including a core and a cladding and configured to emit light through a side surface of the fiber, characterized in that a resin used for the core is at least one selected from the group consisting of polymethyl methacrylate, polymethyl methacrylate copolymers, polystyrene, polycarbonates, polyorganosiloxanes, and norbornene, a resin used for the cladding is fluorine resin, and the light-emitting fiber has a fiber diameter of 95 μm or less.

Advantages of the Invention

According to the present invention, a light-emitting fiber with high flexibility and high processability can be provided.

DESCRIPTION OF EMBODIMENTS

A light-emitting fiber of the present invention has a two-layer structure of a core (inner layer) and a cladding (outer layer) and has a substantially circular shape in section taken in the radial direction.

Examples of a resin used for the core (hereinafter sometimes referred to as the "core resin") include polymethyl methacrylate (PMMA), polymethyl methacrylate copolymers (copolymers mainly composed of methyl methacrylate), polystyrene, polycarbonates, polyorganosiloxanes (silicones), and norbornene. Among these, polymethyl methacrylate or polymethyl methacrylate copolymers are preferred in terms of refractive index, bending fatigue, and heat resistance. Polymethyl methacrylate is particularly preferred in terms of transparency.

These materials may be used either singly or in combination of two or more. The core resin may contain an additive such as plasticizer, dye, pigment, inorganic particles, and light diffusing material.

In order to collect fibers with small fiber diameters, it is necessary to sufficiently reduce the melt viscosity, and thermoforming at temperatures as high as about 260° C. is therefore required. Since the above core resin needs to have heat resistance that can withstand high-temperature forming, it is preferable that the 1% weight loss temperature of the core fiber as measured in thermogravimetric analysis be 260° C. or more. When the 1% weight loss temperature is lower than 260° C., deterioration of the resin may occur, and impurities may be mixed into the core resin, which may result in reduced light-emission performance. The 1% weight loss temperature is more preferably 280° C. or higher, and even more preferably 300° C. or higher.

As used herein, the "1% weight loss temperature" refers to the temperature at which 1% mass loss occurs as measured in thermogravimetry according to JIS K 7120 "Testing Methods of Plastics by Thermogravimetry."

A resin used for the cladding (hereinafter sometimes referred to as the "cladding resin") is fluorine resin that has a low refractive index. The fluorine resin can be crystalline fluorine resin or a copolymer thereof, and some examples of the fluorine resin include polyvinylidene fluoride (PVDF), polytetrafluoroethylene (PTFE), polyvinyl fluoride (PVF), polychlorotrifluoroethylene (PCTFE), ethyl trifluoroacetate (EFA), tetrafluoroethylene-perfluoroalkylvinyl ether copolymers (PFA), tetrafluoroethylene-hexafluoropropylene copolymers (FEP), chlorotrifluoroethylene-ethylene copolymers (ETFE), and chlorotrifluoroethylene-ethylene copolymers (ECTFE). Other examples of the fluorine resin include polyvinylidene fluoride-hexafluoropropylene copolymers (PVDF-HFP) and polyvinylidene fluoride-trifluoroethylene which are copolymers of polyvinylidene fluoride. Among these, polyvinylidene fluoride or copolymers of polyvinylidene fluoride are preferred in terms of melt formability and refractive index.

These materials may be used either singly or in combination of two or more. The cladding resin may contain an additive such as plasticizer, dye, pigment, inorganic particles, and light diffusing material.

The refractive index of the core resin is chosen to be higher than the refractive index of the cladding resin in order to provide sufficient light-emission properties in a long optical path. For the refractive indices of the core and cladding, it is preferable that the numerical aperture given by the following equation (1) be 0.40 or more and 0.65 or less. The numerical aperture represents the magnitude of the maximum angle of incidence at which light is totally reflected in the core.

[Math 1]

$$\text{Numerical aperture} = \{(\text{refractive index of core resin})^2 - (\text{refractive index of cladding resin})^2\}^{1/2} \quad (1)$$

The thickness of the cladding layer is preferably 2.0 to 15.0 μm. With the thickness of the cladding layer being 2.0 μm or more, light can be totally reflected at the interface between the core and the cladding. The thickness of the cladding layer is more preferably 2.5 μm or more. With the thickness of the cladding layer being 15.0 μm or less, light is less absorbed in the cladding, and the length in the longitudinal direction of a side emission area is increased. The thickness of the cladding layer is more preferably 10.0 μm or less, and even more preferably 7.5 μm or less.

The fiber diameter (diameter) of the light-emitting fiber of the present invention is 95 μm or less (i.e., single yarn fineness of 78 dtex or less). With the fiber diameter of the light-emitting fiber being 95 μm or less, the light-emitting fiber has improved flexibility and thus can be handled with greater ease. Since the light-emitting fiber of the present invention can thus be more easily processed into a fiber structure such as a woven or knitted fabric, a fiber structure with excellent bending properties can be provided.

The fiber diameter of the light-emitting fiber is preferably 90 μm or less (single yarn fineness of 77 dtex or less), more preferably 80 μm or less (single yarn fineness of 55 dtex or less), even more preferably 70 μm or less (single yarn fineness of 42 dtex or less), and particularly preferably 50 μm or less (single yarn fineness of 24 dtex or less). The lower limit of the fiber diameter of the light-emitting fiber is not particularly limited, but is preferably 10 μm or more (single yarn fineness of 0.86 dtex or more) in terms of ease of handling.

The total fineness of the light-emitting fiber of the present invention is not particularly limited, but is preferably 50 to 10000 dtex, more preferably 80 to 5000 dtex, even more preferably 100 to 2000 dtex, and particularly preferably 200 to 1000 dtex. The filament count is not particularly limited, but is preferably 2 to 1000, and more preferably 5 to 500.

In the light-emitting fiber of the present invention, it is preferable that the number of double folds required to break the light-emitting fiber (double fold number) in a bending fatigue test by an MIT method defined in JIS P 8115 (1994) (bending fatigue test that is conducted under load per fineness of 0.04 g/dtex and at a bending angle of 135°) be 100 or more. This is because, when the number of double folds required to break the light-emitting fiber is 100 or more, the bending fatigue resistance of the light-emitting fiber is further improved and therefore the mechanical properties (strength) of the fiber structure using the light-emitting fiber, such as a woven or knitted fabric, is improved.

Since the light-emitting fiber of the present invention is a fiber with a fiber diameter of 95 μm or less as described above, desired twisting can be performed when manufacturing a woven or knitted fabric using a multifilament of this light-emitting fiber.

In order to facilitate processing of the multifilament into a woven fabric or knitted fabric, it is essential that the multifilament be able to be twisted. In particular, the maximum number of twists that does not cause breakage of the multifilament is preferably 400 twists/m or more, and more preferably 800 twists/m or more.

The light-emitting fiber of the present invention is manufactured by heating and melting the cladding resin and the core resin in separate melting systems, feeding the molten cladding resin and the molten core resin to a spinneret by commonly used extrusion spinning machines, combining both components according to a desired core-cladding type composite shape immediately before the spinneret, and winding the extruded thread. It is also possible to perform drawing and subsequently heat treatment, as necessary.

Specific methods that can be used include: what is called POY or FOY drawing in which the thread is taken up at 1000 m/min or less, and as necessary, is wound and then drawn; and spin drawing in which the thread is drawn without being wound. A preferred method is a method in which the thread is taken up at 300 to 2000 m/min, more preferably 600 to 1500 m/min, and is used as it is as a product.

In the case where drawing is performed, it may be either single-stage drawing or two-stage drawing. The draw ratio varies significantly depending on the spinning speed and is therefore not uniquely specified. However, it is preferable to use a draw ratio that is about 50 to 85% of the draw ratio that leads to breakage. It is also preferable to set the heat treatment temperature to a value that is high but not high enough to cause fluffing.

When using a flow dividing plate in which is the core resin and the cladding resin are distributed to nozzle holes, the shear rate reaches the order of $10^2$ $s^{-1}$. When using a nozzle in which the cladding resin and the core resin are combined with a polymer that is a sheath component and through which the combined materials are extruded, the shear rate reaches the order of $10^3$ $s^{-1}$.

In view of the above, the inventors found that the melt viscosities of the core resin and cladding resin affects the light-emission performance. Specifically, it is preferable that the core resin and cladding resin have a melt viscosity of 300 Pa·s or less at a shear rate at 260° C. of 1216 $s^{-1}$, and that the ratio (a/b) of the melt viscosity a of the core resin to the melt viscosity b of the cladding resin be in the range of 0.1 to 8.0 in the region where the shear rate at 260° C. is 10 to 500 $s^{-1}$. With the melt viscosity ratio of the core resin to the cladding resin in this range, a fiber with high cross-sectional uniformity can be obtained, and light-emission performance in the longitudinal direction can be improved. This ratio (a/b) is more preferably 0.3 to 6.0, even more preferably 0.5 to 4.0, and particularly preferably 0.5 to 2.0.

The light-emitting fiber of the present invention obtained as described above can be used as various fiber structures (fiber assemblies). The fiber structure as used herein may be not only a woven or knitted fabric composed of the light-emitting fiber of the present invention alone but also a woven or knitted fabric using the light-emitting fiber of the present invention in a part thereof (e.g., a fabric interknitted with other fiber such as natural fiber, chemical fiber, or synthetic fiber, or a woven or knitted fabric using blended yarn, combined filament yarn), a paralleled yarn, a braided fabric, etc.

Application examples of the fiber structure using the light-emitting fiber of the present invention in at least a part thereof include: indoor and outdoor lighting fixtures such as fluorescent lamps and LED lamps; automobile interiors and seats; interiors such as curtains and sofas; clothing such as dresses, skirts, and jackets; medical applications such as phototherapy; and pressure sensors.

EXAMPLES

The present invention will be described below based on examples. The present invention is not limited to these examples. These examples can be modified or altered based on the spirit and scope of the present invention, and these modifications and alterations are not excluded from the scope of the present invention.

Example 1

<Measurement of Melt Viscosity>

The melt viscosity of polyvinylidene fluoride (made by ARKEMA, trade name: Kynar 710, refractive index: 1.42) that is a cladding resin and the melt viscosity of polymethyl methacrylate (made by KURARAY CO., LTD., trade name: PARAPET GH-1000S, refractive index: 1.49) that is a core resin were measured using CAPILOGRAPH "1C PMD-C" made by TOYO SEIKIKOGYO CO., LTD. under the condition that the shear rate at 260° C. was 1216 s$^{-1}$, and the melt viscosity ratio of the core resin to the cladding resin was calculated. The numerical aperture was also calculated from the refractive indices of the core resin and cladding resin using the above equation (1). The results are shown in Table 1.

<Measurement of 1% Weight Loss Temperature>

Changes in weight of polymethyl methacrylate during a heating process were measured under nitrogen atmosphere using a thermogravimetric analyzer (made by Rigaku Corporation, trade name: TG-DTA Thermo Plus 2).

More specifically, the measurement was carried out under the following conditions: sample weight: about 10 mg, and temperature increase rate: 10° C./min. The 1% weight loss temperature, which is a temperature at which the sample's weight was reduced by 1% from the weight at the start of the measurement, was measured. The result is shown in Table 1.

<Production of Light-Emitting Fiber>

First, the copolymer of polyvinylidene fluoride and polymethyl methacrylate described above were supplied to a composite fiber spinning machine.

Next, the core resin and the cladding resin were melt-extruded using separate melt extruders and combined in a nozzle part so as to obtain core-cladding fibers with a composite weight ratio (core component/cladding component) of 80/20 at a spinning temperature of 260° C. The molten core and cladding resins were then discharged from a 24-hole nozzle with a hole diameter of 0.3 mmϕ, and wound at 750 m/min. Light-emitting fibers with a fiber diameter of 46 μm, a single yarn fineness of 20 dtex, and a cladding thickness of 2 μm were thus obtained.

<Spinnability Evaluation>

Spinnability was evaluated according to the following evaluation criteria. The result is shown in Table 1.

Continuous fibers were able to be collected with no breakage during spinning for 24 hours: Very good Fiber breakage occurred 1 to 5 times during spinning for 24 hours: Good Fiber brakeage occurred 6 or more times during spinning for 24 hours: Poor <Measurement of Side Luminance of Light-Emitting Fibers>

A white LED (luminous flux: 135 lm, directional characteristics: 120°) was used as a light source, and emission brightness was measured at 20 cm and 30 cm from the light source using a spectroradiometer (made by TOPCON TECHNOHOUSE CORPORATION, trade name: SR-3A). The side brightness retention rates were then calculated using the following equation (2). The results are shown in Table 1.

[Math 2]

$$\text{Side brightness retention rate}[\%] = (\text{emission brightness at measurement position})/(\text{emission brightness at 10 cm from light source}) \times 100 \quad (2)$$

<Flexibility Evaluation>

Flexibility was evaluated using a cantilever tester with a slope (tilt angle: 45°) at one end of its base. More specifically, a 150 mm-long filament was obtained as a test piece from the produced light-emitting fibers. The test piece was slid along the base toward the slope at a constant speed, and the moved distance of the test piece at the moment the filament was bent and an end of the filament touched the slope was measured. A filament with high flexibility tends to bend downward due to its own weight and touch the slope with a shorter moved distance. Accordingly, the smaller the value of the moved distance, the higher the flexibility of the filament. The result is shown in Table 1.

<Bending Fatigue Evaluation>

The produced light-emitting fibers were bundled to 5000 dtex. The fiber bundle was supported by a mandrel with a diameter of 20 mm under load of 200 g (i.e., load per fineness: 0.04 g/dtex), and the other end of the fiber bundle was continuously bent back and forth at an angle of 135° about the support point. The number of double folds required to completely break the fiber bundle was thus measured. The result is shown in Table 1.

<Twistability Evaluation>

A multifilament of the produced light-emitting fibers (filament count: 24) was prepared. By using a twist counter (made by DAIEI KAGAKU SEIKI MFG. CO., LTD., trade name: Twist Counter M-1), the produced light-emitting fibers (length: 50 cm) were twisted in a left-hand lay under load of 0.025 g/dtex, and the number of twists required to break the multifilament was measured. The result is shown in Table 1. The measured maximum number of twists (per 50 cm) is doubled in Table 1. Namely, the number of twists shown in Table 1 is the number of twists per meter.

<Processability Evaluation>

A knitted fabric was produced using a test knitting machine (model: MR-1) made by Maruzen Sangyo Co., Ltd. under the following conditions: total fineness of fibers: 480 dtex, gauge number: 200, and feeding speed: 40 rpm/min. The process passability during this production of the knitted fabric was measured according to the following evaluation criteria, and the processability was evaluated. The result is shown in Table 1.

Number of single yarn breakages occurred, or number of loops formed, during production of 1 meter of knitted fabric was 0: Good Number of single yarn breakages occurred, or number of loops formed, during production of 1 meter of knitted fabric was 1 or more: Poor Example 2

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers with a fiber diameter of 65 μm, a single yarn fineness of 40 dtex, and a cladding thickness of 2.5 μm were obtained by winding at 375 m/min. The results are shown in Table 1.

Example 3

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers with a fiber diameter of 80 μm, a single yarn fineness of 55 dtex, and a cladding thickness of 2.8 μm were obtained by winding at 273 m/min. The results are shown in Table 1.

Example 4

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers were obtained using PMMA with a melt viscosity of 20 Pa·s and a 1% weight loss temperature of 270° C. as a core resin. The results are shown in Table 1.

Example 5

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers were obtained using a PMMA copolymer with a melt viscosity of 40 Pa·s and a 1% weight loss temperature of 250° C. as a core resin. The results are shown in Table 1.

Example 6

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers with a fiber diameter of 90 μm, a single yarn fineness of 77 dtex, and a cladding thickness of 4.0 μm were obtained by winding at 195 m/min. The results are shown in Table 1.

Example 7

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers with a fiber diameter of 80 μm, a single yarn fineness of 55 dtex, and a cladding thickness of 2.8 μm were obtained by using PMMA with a melt viscosity of 250 Pa·s and a 1% weight loss temperature of 336° C. as a core resin and winding at 273 m/min. The results are shown in Table 1.

Comparative Example 1

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers with a fiber diameter of 100 μm, a single yarn fineness of 91.5 dtex, and a cladding thickness of 3 μm were obtained by winding at 164 m/min. The results are shown in Table 1.

Comparative Example 2

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers with a fiber diameter of 150 μm, a single yarn fineness of 214 dtex, and a cladding thickness of 4 μm were obtained by winding at 70 m/min. The results are shown in Table 1.

Comparative Example 3

Spinnability evaluation, flexibility evaluation, bending fatigue evaluation, twistability evaluation, processability evaluation, and measurement of side luminance of light-emitting fibers were carried out in a manner similar to that of Example 1 except that light-emitting fibers with a fiber diameter of 48 μm and a single yarn fineness of 20 dtex were obtained by melt-extruding the same core resin as that of Example 1 alone. The results are shown in Table 1.

TABLE 1

| | | Example 1 | Example 2 | Example 3 | Example 4 | Example 5 |
|---|---|---|---|---|---|---|
| Fiber | Fiber Diameter [μm] | 46 | 65 | 80 | 46 | 46 |
| | Single Yarn Fineness [dtex] | 20 | 40 | 55 | 20 | 20 |
| | Cladding Thickness [μm] | 2.0 | 2.5 | 2.8 | 2.0 | 2.0 |
| Core | Resin | PMMA | PMMA | PMMA | PMMA | PMMA Copolymer |
| | Refractive Index | 1.49 | 1.49 | 1.49 | 1.49 | 1.49 |
| | Melt Viscosity [Pa · s] (260° C., 1216 s$^{-1}$) | 118 | 118 | 118 | 20 | 40 |
| | 1% Weight Loss Temperature [° C.] | 331 | 331 | 331 | 270 | 250 |
| Cladding | Resin | PVDF | PVDF | PVDF | PVDF | PVDF |
| | Refractive Index | 1.42 | 1.42 | 1.42 | 1.42 | 1.42 |
| | Melt Viscosity [Pa · s] (260° C., 1216 s$^{-1}$) | 165 | 165 | 165 | 165 | 165 |
| Melt Viscosity Ratio (a/b) of Core Resin (a) to Cladding Resin (b) (260° C., 10 to 500 s$^{-1}$) | | 0.7 | 0.7 | 0.7 | 0.1 | 0.2 |
| Numerical Aperture | | 0.451 | 0.451 | 0.451 | 0.451 | 0.451 |
| Spinnability | | Very Good | Very Good | Very Good | Good | Good |
| Side Brightness | 20 cm | 49 | 50 | 50 | 27 | 23 |
| Retention Rate [%] | 30 cm | 43 | 46 | 44 | 13 | 10 |
| Flexibility | Moved Distance [mm] | 53 | 64 | 66 | 52 | 51 |

TABLE 1-continued

| | | | | | | |
|---|---|---|---|---|---|---|
| Bending Fatigue | Number of Double Folds [folds] | 5971 | 1706 | 700 | 6003 | 5809 |
| Twistability | Number of Twists Required to Cause Breakage [twists/m] | 1880 | 1320 | 880 | 1010 | 890 |
| Processability | | Good | Good | Good | Good | Good |

| | | Example 6 | Example 7 | Comparative Example 1 | Comparative Example 2 | Comparative Example 3 |
|---|---|---|---|---|---|---|
| Fiber | Fiber Diameter [μm] | 90 | 80 | 100 | 150 | 48 |
| | Single Yarn Fineness [dtex] | 77 | 55 | 91.5 | 214 | 20 |
| | Cladding Thickness [μm] | 4.0 | 2.8 | 3.0 | 4.0 | — |
| Core | Resin | PMMA | PMMA | PMMA | PMMA | PMMA |
| | Refractive Index | 1.49 | 1.49 | 1.49 | 1.49 | 1.49 |
| | Melt Viscosity [Pa · s] (260° C., 1216 s$^{-1}$) | 118 | 250 | 118 | 118 | 118 |
| | 1% Weight Loss Temperature [° C.] | 331 | 336 | 331 | 331 | 331 |
| Cladding | Resin | PVDF | PVDF | PVDF | PVDF | — |
| | Refractive Index | 1.42 | 1.42 | 1.42 | 1.42 | — |
| | Melt Viscosity [Pa · s] (260° C., 1216 s$^{-1}$) | 165 | 165 | 165 | 165 | — |
| Melt Viscosity Ratio (a/b) of Core Resin (a) to Cladding Resin (b) (260° C., 10 to 500 s$^{-1}$) | | 0.7 | 1.5 | 0.7 | 0.7 | — |
| Numerical Aperture | | 0.451 | 0.451 | 0.451 | 0.451 | — |
| Spinnability | | Very Good | Good | Good | Good | Very Good |
| Side Brightness | 20 cm | 53 | 50 | 50 | 50 | 2 |
| Retention Rate [%] | 30 cm | 47 | 45 | 30 | 30 | 0.3 |
| Flexibility | Moved Distance [mm] | 70 | 68 | 84 | 102 | 49 |
| Bending Fatigue | Number of Double Folds [folds] | 105 | 650 | 10 | 2 | 6204 |
| Twistability | Number of Twists Required to Cause Breakage [twists/m] | 460 | 820 | 340 | 100 | 2018 |
| Processability | | Good | Good | Poor | Poor | Good |

As shown in Table 1, the light-emitting fibers of Examples 1 to 7 with a fiber diameter of 95 μm or less have higher flexibility than Comparative Examples 1 and 2 as the moved distance at the moment the end of the filament touched the slope is shorter than in Comparative Example 1 and 2.

The light-emitting fibers of Examples 1 to 7 have higher bending fatigue resistance than Comparative Examples 1 and 2 as the number of double folds required to cause breakage is significantly larger than in Comparative Examples 1 and 2.

The light-emitting fibers of Examples 1 to 7 have higher processability than Comparative Examples 1 and 2 as the number of twists required to break the multifilament is significantly larger than in Comparative Examples 1 and 2.

The light-emitting fibers of Examples 1 to 7 have higher light-emission performance than Comparative Example 3.

INDUSTRIAL APPLICABILITY

As described above, the present invention is particularly suitable for light-emitting fibers that are used for fiber structures.

The invention claimed is:

1. A fabric, comprising:
a plurality of light-emitting fibers having a fiber diameter of 95 μm or less and comprising a core and a cladding and configured to emit light through a side surface of the fiber, wherein:
a resin used for the core is at least one selected from the group consisting of polymethyl methacrylate, polymethyl methacrylate copolymers, polystyrene, polycarbonates, polyorganosiloxanes, and norbornene;
a resin used for the cladding is fluorine resin; and
the light-emitting fibers are multifilament and are woven or knitted to form the fabric.

2. The fabric according to claim 1, wherein the number of double folds required to break the light-emitting fibers in a bending fatigue test that is conducted under load per fineness of 0.04 g/dtex and at a bending angle of 135° is 100 or more.

3. The fabric according to claim 1, wherein a maximum number of twists that does not cause breakage of the multifilament is 400 twists/m or more.

4. The fabric according to claim 1, wherein the resin used for the core of the light-emitting fibers and the resin used for the cladding of the light-emitting fibers have a melt viscosity of 300 Pas or less at a shear rate at 260° C. of 1216 s$^{-1}$, and
wherein a ratio (a/b) of the melt viscosity a of the core of the light-emitting fibers to the melt viscosity b of the cladding of the light-emitting fibers is in a range of 0.1 to 8.0 in a region where the shear rate at 260° C. is 10 to 500 s$^{-1}$.

5. The fabric according to claim 1, wherein a 1% weight loss temperature of the resin used for the core of the light-emitting fibers is 260° C. or higher.

6. The fabric according to claim 1, wherein the resin used for the core of the light-emitting fibers is polymethyl methacrylate.

7. The fabric according to claim 1, wherein the resin used for the cladding of the light-emitting fibers is at least one selected from the group consisting of polyvinylidene fluoride, polytetrafluoroethylene, polyvinyl fluoride, polychlorotrifluoroethylene, ethyl trifluoroacetate, tetrafluoroethylene-perfluoroalkylvinyl ether copolymers, tetrafluoroethylene-hexafluoropropylene copolymers, chlorotrifluoroethylene-ethylene copolymers, and chlorotrifluoroethylene-ethylene copolymers.

8. The fabric according to claim 1, wherein the resin used for the cladding of the light-emitting fibers is polyvinylidene fluoride.

9. The fabric according to claim 1, wherein the cladding of the light-emitting fibers has a thickness from 2.0 to 15.0 μm.

10. The fabric according to claim 1, wherein the light-emitting fibers have a fiber diameter of 90 μm or less.

11. The fabric according to claim 1, wherein the light-emitting fibers have a fiber diameter of 80 μm or less.

12. The fabric according to claim 1, wherein the light-emitting fibers have a fiber diameter of 70 μm or less.

13. The fabric according to claim 1, wherein the light-emitting fibers are woven to form the fabric.

14. The fabric according to claim 1, wherein the light-emitting fibers are knitted to form the fabric.

15. The fabric according to claim 1, wherein the filament count of the multifilament is at least 5.

16. The fabric according to claim 1, wherein the filament count of the multifilament is 5-500.

* * * * *

UNITED STATES PATENT AND TRADEMARK OFFICE
CERTIFICATE OF CORRECTION

| | |
|---|---|
| PATENT NO. | : 11,754,776 B2 |
| APPLICATION NO. | : 17/286554 |
| DATED | : September 12, 2023 |
| INVENTOR(S) | : Takeshi Tsudaka et al. |

It is certified that error appears in the above-identified patent and that said Letters Patent is hereby corrected as shown below:

On the Title Page

Right Column, Line 15 item (56) (FOREIGN PATENT DOCUMENTS):
"JP 20013500524"
Should read:
--JP 2001350052A--

Signed and Sealed this
Twenty-third Day of January, 2024

Katherine Kelly Vidal
*Director of the United States Patent and Trademark Office*